US007042938B2

(12) United States Patent
Malkov et al.

(10) Patent No.: US 7,042,938 B2
(45) Date of Patent: May 9, 2006

(54) SOFT BIT COMPUTATION FOR A REDUCED STATE EQUALIZER

(75) Inventors: Andrei Malkov, Salo (FI); Heikki Berg, Tampere (FI); Pekka Kaasila, Oulu (FI); Kiran Kumar Kuchi, Irving, TX (US); Jan C. Olivier, Highland Village, TX (US)

(73) Assignee: Nokia Corporation, Espoo (FI)

( * ) Notice: Subject to any disclaimer, the term of this patent is extended or adjusted under 35 U.S.C. 154(b) by 627 days.

(21) Appl. No.: 09/928,927

(22) Filed: Aug. 13, 2001

(65) Prior Publication Data
US 2003/0053535 A1    Mar. 20, 2003

(51) Int. Cl.
*H04B 1/38* (2006.01)

(52) U.S. Cl. .................. 375/233; 375/341; 375/350; 375/261; 714/794; 714/795; 714/792

(58) Field of Classification Search ................ 375/233, 375/341, 350, 261; 714/794, 792, 796
See application file for complete search history.

(56) References Cited

U.S. PATENT DOCUMENTS

| 5,502,735 | A | 3/1996 | Cooper ....................... 719/794 |
| 6,134,277 | A | 10/2000 | Shah .......................... 375/341 |
| 6,625,236 | B1 * | 9/2003 | Dent et al. .................. 375/341 |
| 2003/0053535 | A1 * | 3/2003 | Malkov et al. ............. 375/233 |

OTHER PUBLICATIONS

"Reduced-State Sequence Estimation With Set Partitioning and Decision Feedback," by M. Vedat Eyuboğlu and Shahid U. H. Qureshi, *IEEE Transactions on Communications*, vol. 36, No. 1, Jan. 1988, pp. 13-20.

"Optimum and Sub-Optimum Detection of Coded Data Disturbed by Time-Varying Intersymbol Interference," by Wolfgang Koch and Alfred Baier, *IEEE*, CH2827-4/90/0000-1679, 1990, pp. 807.5.1-807.5.6.

"Transactions Papers—Block Decision Feedback Equalization," by D. Williamson, R. A. Kennedy and G. W. Pulford, *IEEE Transactions on Communications*, vol. 40, No. 2, Feb. 1992, pp. 255-264.

"Reduced-State Soft-Output Trellis-Equalization Incorporating Soft Feedback," by S. H. Müller, W. H. Gerstacker and J. B. Huber, *Proceedings of the IEEE Global Telecommunications Conference GLOBECOM '96*, Nov. 1996, London, pp. 95-100.

* cited by examiner

*Primary Examiner*—Stephen Chin
*Assistant Examiner*—Eva Zheng

(57) ABSTRACT

Method and apparatus for soft bit computation with a reduced state equalizer. The method assures that the number of states in the equalizer is reduced to obtain acceptable complexity, while also ensuring that soft bit computation is performed for substantially all bits. The method involves computing a first set of soft bits from bits transmitted in a received signal, using a reduced-state trellis with finite non-zero delay, calculating hard decisions in response to the received signal, and also ensuring that substantially all soft bits are computed by employing zero-delay soft decision-making or decision-feedback equalization to compute a second set of soft bits. Furthermore, the hard decisions are used to compute the second set.

29 Claims, 8 Drawing Sheets

SOFT BIT COMPUTATION FOR A REDUCED STATE EQUALIZER

TECHNICAL FIELD OF THE INVENTION

This invention relates generally to digital communication, and more particularly to low complexity equalization.

BACKGROUND ART

For Time Domain Multiple Access (TDMA) wireless communications systems, an important problem is to mitigate intersymbol interference (ISI) caused when data is transmitted on a dispersive channel with accompanying background noise. This problem is different depending upon what type of air interface is employed. In a second generation system such as the global system for mobile communications (GSM) it suffices to treat the ISI problem in ways that are not adequate for third generation air interfaces such as EDGE (enhanced data rates for GSM evolution). In GSM, optimum performance in terms of error probability is typically accomplished by maximum likelihood sequence estimation (MLSE), but MLSE detection cannot be used to perform optimal equalization in EDGE, due to changes in both the modulation and the channel coding.

When discrete pulses or bursts of information are transmitted through a dispersive medium, they travel over multiple propagation paths to the receiver, and the information transmitted to the receiver will appear smeared. These multipath effects commonly result when signals are reflected to the receiver. The process implemented on the received signal to mitigate ISI is known as "equalization." This equalization process estimates the individual data symbols which were originally transmitted.

Various approaches have been taken to the equalization problem; linear equalization and decision-feedback equalization (DFE) are two common equalization strategies. However, DFE has poor performance in weak channel coding schemes, such as EDGE transmission modes MCS8–9. A somewhat better approach has been based on MLSE, using the well-known Viterbi algorithm, although this approach ahs drawbacks as explained below. See Shah (U.S. Pat. No. 6,134,277); Cooper (U.S. Pat. No. 5,502,735).

Those skilled in the art will understand that a communication channel behaves in many respects like a filter, and therefore ISI itself may be modelled as a filter. The length of the filter is the extent of ISI, and this length may be referred to as the impulse response length L. Unlike DFE, MLSE detection typically uses trellis diagrams which show a progression of states with the passage of time, and the number of states S is given by M to the power of L−1 (i.e. $S=M^{L-1}$) where M is the number of symbol levels in the data alphabet used. Consequently, for large response lengths and large alphabet sizes, the equalizer implementation becomes immensely complex. The complexity of the Viterbi Algorithm increases exponentially with channel length, and therefore implementation of the full Viterbi Algorithm becomes unacceptably complex in EDGE. Thus, MLSE using the full Viterbi algorithm is inadequate, and a sub-optimal equalizer capable of performance comparable to that of MLSE is necessary, with acceptable low complexity.

A well-known sub-optimal type of equalizer employs Reduced State Sequence Estimation (RSSE), wherein a reduced-state maximum likelihood (ML) trellis uses set partitioning and decision feedback techniques. See, for example, "Reduced-State Sequence Estimation With Set Partitioning and Decision Feedback" by M. Eyuboglu, and S. Qureshi, IEEE Trans. Comm., vol. 36, pp. 12–20, January 1988. A particularly useful special case of RSSE is Delayed Decision Feedback Sequence Estimation (DFSE). A precondition for applying RSSE is that the input signal is of minimum phase (i.e. the impulse response power decays in time), and this condition can be satisfied by applying pre-filtering to the received signal, for example using a DFE feedforward filter.

Additional equalization reliability measures are helpful in order to improve channel decoding subsequent to equalization, and for this purpose it is desirable to generate soft-output information. Soft bits contain important reliability information that greatly aids the decoder located within the receiver downstream from the equalizer.

Soft-output information can be produced by an algorithm called symbol-by-symbol Maximum A Posteriori (MAP) decoding, which can calculate the probability of each symbol given the whole sequence that has been received. For example, see "Reduced State Soft-Output Trellis-Equalization Incorporating Soft Feedback," by Müller et al., Proc. IEEE GLOBECOM '96, November 1996. A max-log-MAP algorithm is familiar to persons skilled in the art as a simplified version of a MAP algorithm, and max-log-MAP equalizers operate in a logarithmic domain as compared to a probability domain. Another known method for producing soft-output information is using decision feedback partial sequence estimation (DFPSE). DFPSE equalizers are equalizers which employ a non-zero delay reduced state trellis calculation and which achieve reduction of implementation complexity by (1) employing decision feedback, (2) relying on improved accuracy of initial symbol detection which reduces the scope of searching, and (3) using ML or Max-log-MAP detection criteria. DFPSE is also known as block decision feedback equalization. See "Block Decision Feedback Equalization" by Williamson et al., IEEE Trans Comm., vol. 40, pp. 255–264, February 1992. As will be understood by those of ordinary skill in the art, non-zero delay refers to the those situations in which, after a signal is received, there must be a waiting period before soft bits are computed, and this may be due to the need to examine more than one received symbol.

Although using a reduced number of states "S" (e.g. via RSSE or DFPSE) produces very good hard symbol decisions with extremely low complexity, problems arise in producing soft decisions (i.e. soft bits) such as log likelihood ratios or bit probabilities of transmitted bits. A familiar response to these problems is to use trellis truncation, but trellis truncation in and of itself does not allow calculation of MAP or MLSE soft decisions for all bits of a symbol. In other words, when the number of states in the equalizer is reduced to obtain an acceptably low complexity, computing soft bits for all of the bits becomes problematic according to existing methods.

The total number of states in a subset trellis is given by the product of the $J_k$ and each $J_k$ ranges from 1 to M. So, the minimum number of states for an equalizer would be 1 for J={1,1,1 . . . 1} which actually corresponds to DFE. At the other extreme is full MAP or MLSE in which case J={J1, J2, J3 . . . $J_{l-1}$} and $J_j$=M and thus the number of states would be $M^{l-1}$ as discussed above. Recall that "l" is impulse response length, and also bear in mind that the $J_k$ are subject to a constraint J1≧J2≧J3≧ . . . $J_{l-1}$. For an equalizer having J={$J_1$, J2, J3 . . . $J_K$−1, 1, 1 . . . 1} where K≦L and $J_i$<M the hard decision performance remains extremely good, but calculation of adequate soft decisions is difficult. Therefore, a need exists to increase reliable performance of low complexity equalizers, especially for high order modulations, by more fully and successfully producing soft bit information.

In general, EDGE systems involve capture of 2 or 3 taps in the MAP or MLSE part of the equalizer, and this means 8 or 64 states respectively for existing DFSE equalizers, or alternatively 4 or 16 states respectively for existing RSSE/RS-MAP equalizers with 4-way set partitioning. Digital signal processing (DSP) implementation of the simplest 4-state equalizer currently requires some 32 million instructions per second (MIPS) per time slot for EDGE at 8 PSK (phase shift keying). In order to provide higher data rate, it is desirable to have lower complexity algorithms than are currently available, or else DSP will be too costly. Although 2-way set partitioning with RSSE or RS-MAP is a candidate for achieving lower complexity, it entails problematic soft bit computation. Likewise, soft symbol equalization is a candidate for replacing soft bit equalization, but soft symbol equalization is approximately 1.5 dB worse than soft bit equalization for 8 PSK EDGE, and this situation gets even worse for higher order modulations using current technology.

DISCLOSURE OF THE INVENTION

The present invention provides a novel method of computing soft bits (which hereinafter refers to log likelihood ratios or bit probabilities) for any reduced state equalizer. This new method for making soft decisions uses low-complexity, while providing soft bit information for substantially all received bits. This invention allows an equalizer to be implemented with a minimum number of states, while retaining high performance. This reduction of implementation complexity is accomplished by methods which, for example, combine MLSE or MAP soft decisions with either decision-feedback equalization (DFE) decision-making or with other zero-delay soft decision-making.

The method involves computing a first set of soft bits for transmitted bits in a received signal, using a reduced-state trellis with finite non-zero delay, calculating hard decisions in response to the received signal, and also ensuring that substantially all soft bits are computed by employing zero-delay soft decision-making or decision-feedback equalization to compute a second set of soft bits. Furthermore, the hard decisions are used to compute the second set.

This invention assures that the number of states in the equalizer is reduced to obtain an acceptable complexity, while also ensuring that soft bit computation is not omitted for a substantial number of bits. Therefore, this method increases the reliability of low complexity equalization, especially for high order modulations, by more fully and successfully producing soft bit information.

According to the invention, soft bits can be computed from a received signal using a reduced-state trellis with MAP soft decisions, and hard decisions are also computed in response to the received signal. Zero-delay soft decision-making or decision-feedback equalization is also employed, using the hard decisions to compute the soft values, and this ensures that soft bits are computed for substantially all bits. Decision-feedback equalization, using these hard decisions to compute the soft values, is unconventional and provides a marked improvement in soft bit computation.

The present method is flexible in that it can be used in a number of different equalization environments. For example, the trellis calculation may produce maximum a posteriori (MAP) soft decisions, and/or may produce soft decisions with reduced state sequence estimation (RSSE), reduced state MAP, and/or reduced state MLSE. The trellis calculation may utilize maximum likelihood (ML) techniques, and may produce soft decisions with decision feedback partial sequence equalization (DFPSE).

The present soft bit equalization invention not only offers a 1.5 dB gain (or better) as compared to soft symbol equalization, but also allows the number of states in the equalizer to be reduced to the minimum possible value. Note that different types of equalizers are not necessarily altogether different and distinct from each other, and there is often considerable commonality within subsets of equalizers. The present method is applicable not only to various types of equalizers, but also to arbitrary modulation sizes, and to any multiple access schemes such as TDMA/CDMA requiring a reduced state equalizer.

Preferable implementation modes for the present invention include digital signal processor (DSP) and/or the American standard code for information interchange (ASCII). According to current trends, wireless communication will employ higher and higher data density, and the present invention will probably be important for implementing trellis-based soft bit equalizers in any wireless transmission environment that is significantly dispersive, for example in a high density and high delay system like 16–64 QAM (quadrature amplitude modulation).

BEST MODE FOR CARRYING OUT THE INVENTION

Figure 1:
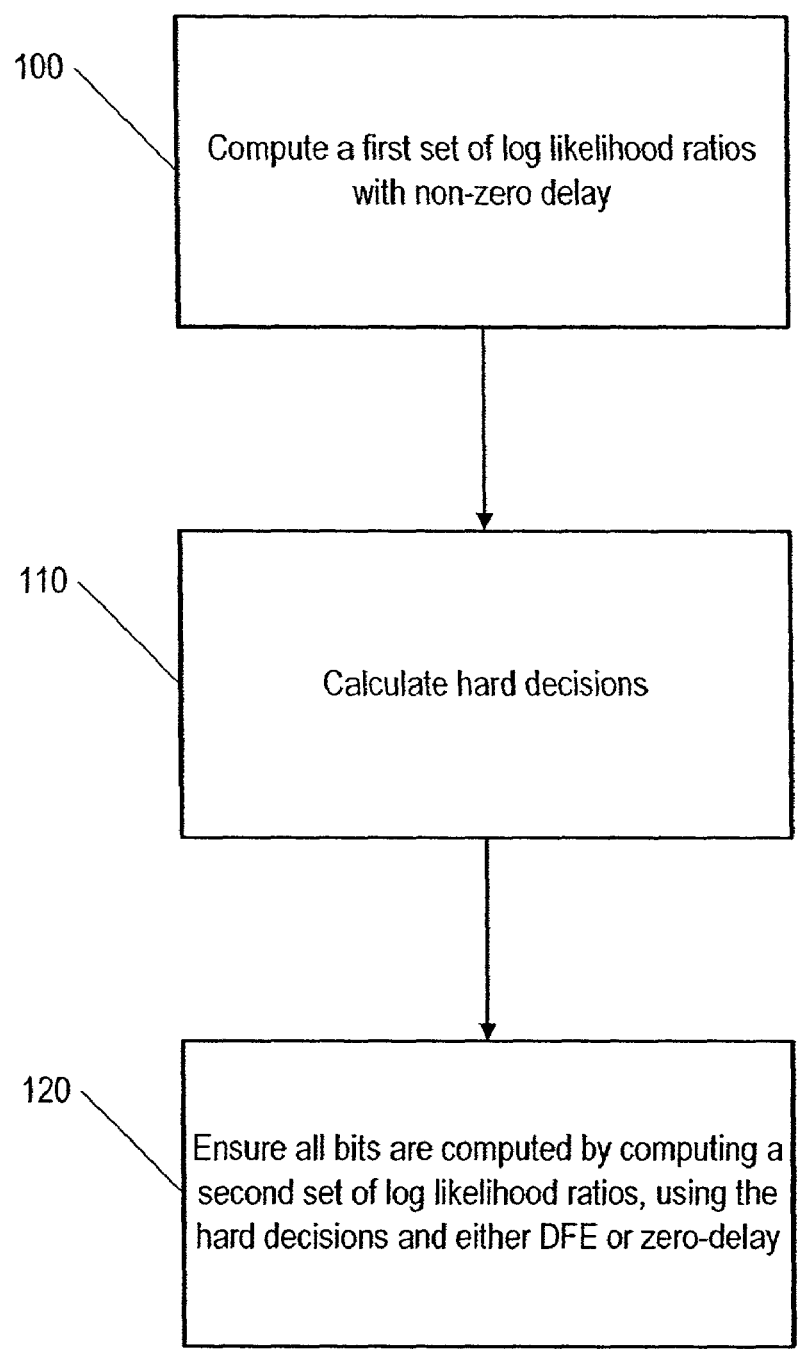
FIG. 1 is a flow chart illustrating basic steps of the present method.

General features of a best embodiment of the present method are illustrated by the flow chart of FIG. 1. The method involves computing 100 a first set of soft bits for bits transmitted in a received signal, using a reduced-state trellis with forward recursion and with finite non-zero delay. Alternatively, the computation 100 may advantageously utilize a Viterbi Algorithm, such as a soft output Viterbi algorithm (SOVA). The method also involves calculating 110 hard decisions in response to the received signal, and also ensuring 120 that substantially all soft bits are computed by employing zero-delay soft decision-making or decision-feedback equalization to compute a second set of soft bits. The hard decisions are used to compute the second set.

Although FIG. 1 depicts a particular sequence for the steps, different sequences can be used in other best mode embodiments. The sequence shown in FIG. 1 is desirable if we want to ensure that the first set of soft bits and the second set of soft bits are soft bits for two different sets of bits. In other words, once the first set is computed 100, then only soft bits for the remaining bits need to be computed 120 for the second set. The hard decisions are calculated 110 using the first set of soft bits. Using the hard decisions to compute soft bits is helpful to reduce error propagation.

In some applications, it will be useful to augment the method shown in FIG. 1, by generating further hard decisions using a traceback operation, checking if the further hard decisions generated using the traceback operation match the hard decisions already calculated in step 110 using the first set of soft bits, and replacing soft bits generated using the trellis with the further hard decisions generated using the traceback operation, if the further hard decisions generated from the traceback operation fail to match respective hard decisions already calculated in step 110.

Figure 2:
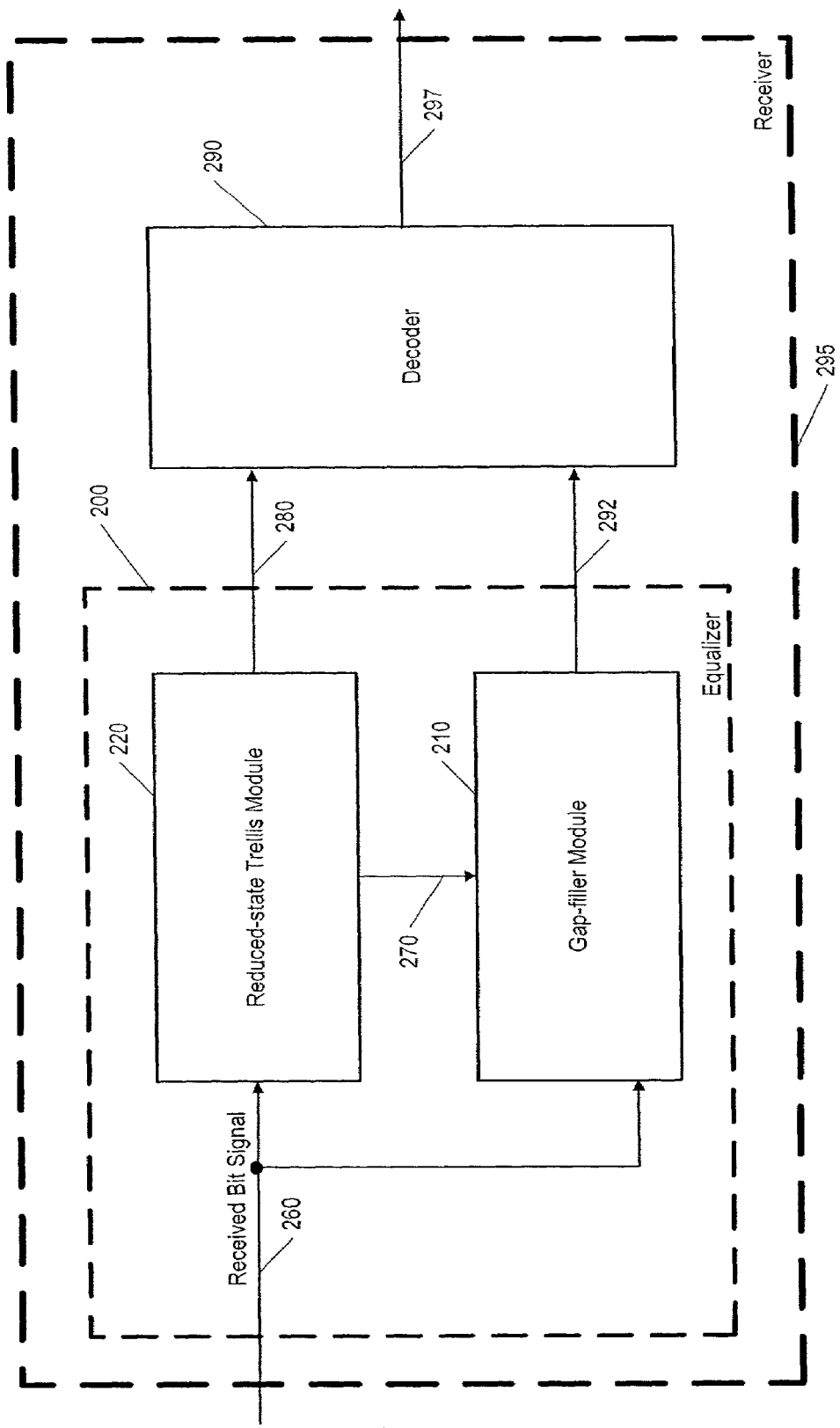
FIG. 2 shows the structure and interactive cooperation within the present invention, in the context of a wireless communication receiver.

As shown in FIG. 2, the present invention can be embodied in a wireless communications receiver 295 containing a reduced-state equalizer 200. The equalizer 200 is capable of providing soft bits to a decoder 290 in order to enhance reliability of channel decoding subsequent to equalization. The reduced-state equalizer includes a reduced-state trellis module 220, responsive to a received bit signal on a line 260, for providing a soft bit signal on a line 280 and a hard decision signal 270 on a line 270. The equalizer also includes a gap-filler module 210, responsive to the received bit signal and also responsive to the hard decision signal 270, for providing a second soft bit signal 292. The second soft bit signal 292 includes soft bits that are absent from the first soft bit signal, so that the first and the second soft bit signals include soft bits for substantially all bits in the received bit signal 260. In other words, the gap-filler module 210 produces soft bits which will fill any gaps in the soft bit computation performed by the reduced-state trellis module 220. The reduced-state trellis module 220 is configured to operate with forward recursion and finite non-zero delay, and the gap-filler module 210 is configured as a decision feedback equalizer or as a zero-delay soft decision-maker (i.e. configured for DFE or zero-delay soft decision-making). The decoder is responsive to the first soft bit signal 280 and the second soft bit signal 292, and is configured to provide a reliably decoded signal 297. Of course, inventive portions of the receiver and equalizer are shown in FIG. 2 while other structures and signals are omitted from FIG. 2 for the sake of clarity.

In this embodiment, the finite non-zero delay employed by the reduced-state trellis module 220 is K minus one (K−1), where K is a truncated impulse response length and is less than or equal to a non-truncated impulse response length L (i.e. K≦L). For the zero-delay soft decision-making, which may be employed by the gap-filler module 210, K vanishes (i.e. K=0). Alternatively, if the gap-filler module 210 is configured for DFE, then the second set soft bits can be obtained with delay K minus two (K−2) if the trellis module 220 is configured for max-log-MAP. But, if the trellis module 220 is of an RSSE type then the gap-filler module 210 can have arbitrary delay. Only forward recursion is used in the best embodiment of the present invention, and thus forward recursion is sufficient without the typical backward recursion, although backward recursion is possible in other embodiments of the present invention.

Figure 3:
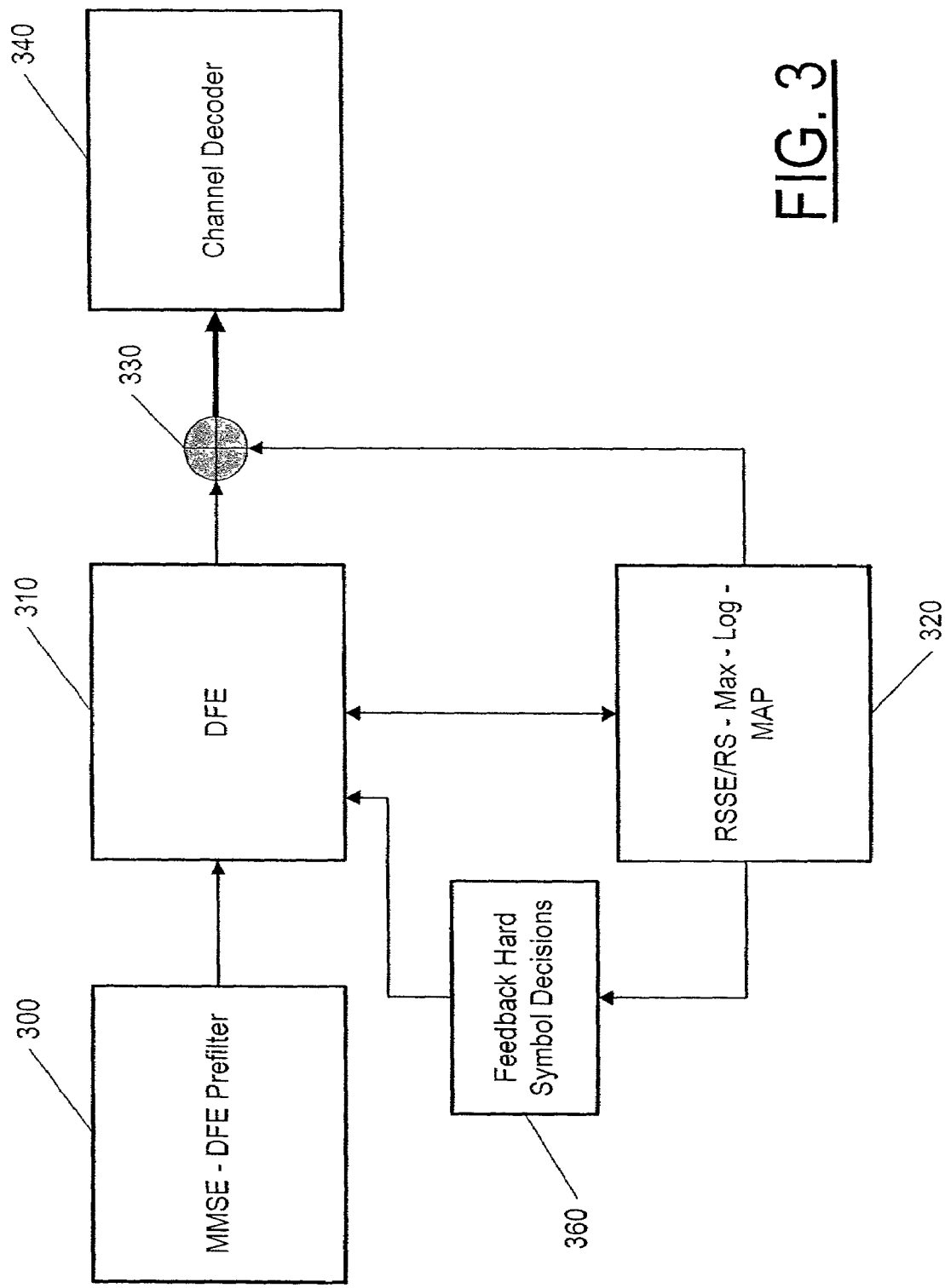
FIG. 3 illustrates an embodiment of the present invention employing DFE and either RSSE or Max-Log-MAP.

FIG. 3 is a flow chart illustrating a particular embodiment of the present invention, employing a DFE step 310 in order to fill gaps, and an RSSE/Max-Log-MAP step 320 to perform a reduced-state trellis calculation. Whereas FIG. 1 showed a non-zero delay computation followed by a DFE computation, FIG. 3 illustrates the DFE computation 310 occurring before the RSSE/Max-Log-MAP step 320 (which is a non-zero delay reduced state trellis calculation). Thus, in the best mode embodiment shown in FIG. 3, a soft bit computed in the DFE step 310 for a certain bit is replaced with a soft bit computed for that bit in the RSSE/Max-Log-MAP step 320 if the soft bit for the bit is computed in the RSSE/Max-Log-MAP step 320; otherwise the soft bit computed for the bit in the DFE step 310 will not be replaced and will effectively fill a gap in the results of the RSSE/Max-Log-MAP step 320. Notice that FIG. 3 shows a feedback step 360, according to which hard symbol decisions are fed back from the RSSE/Max-Log-MAP step 320 to the DFE step 310. The flow chart of FIG. 3 also shows an MSSE-DFE prefiltering step 300 which precedes the other steps just discussed (MMSE stands for minimum mean-squared error), and a channel decoding step 340 which follows the other steps just discussed. Between the decoding step 340 and those other steps discussed, it is useful to include a soft bit output step 330 in order to perform the previously described replacement of soft bits calculated in the DFE step 310 soft bits calculated in the RSSE/Max-Log-MAP step 320 (a soft bit output module could be included upstream from the decoder or within the decoder). Regardless of when, or in what order, the non-zero delay reduced state trellis calculation is performed, it is useful in a best mode embodiment to perform this calculation for as many bits as possible while maintaining acceptable implementation complexity.

In FIG. 3, regarding the feedback step 360 in which hard symbol decisions are fed back from the RSSE/Max-Log-MAP step 320 to the DFE step 310, the hard decisions may be computed using the max-log maximum a posteriori technique. Subsequently, the decision feedback equalization step 310 will be advantageously performed according to a rule described mathematically as follows:

$$\beta_{DFE}(a_k) \approx \left\| r_k - \left( a_k h_o + \sum_{j=1}^{L-1} b_{k-j} h_j \right) \right\|^2 \quad (1)$$

in which beta (β) represents a log symbol probability function, $a_k$ represents a symbol of a modulation alphabet, $r_k$ is a received signal, $b_k$ are the hard decisions, and $h_k$ is channel impulse response length. A decision produced by the DFE step 310 can be used to limit the number of states involved in the RSSE/Max-Log-MAP step 320, but that is not necessary in a best mode embodiment.

Figure 4:
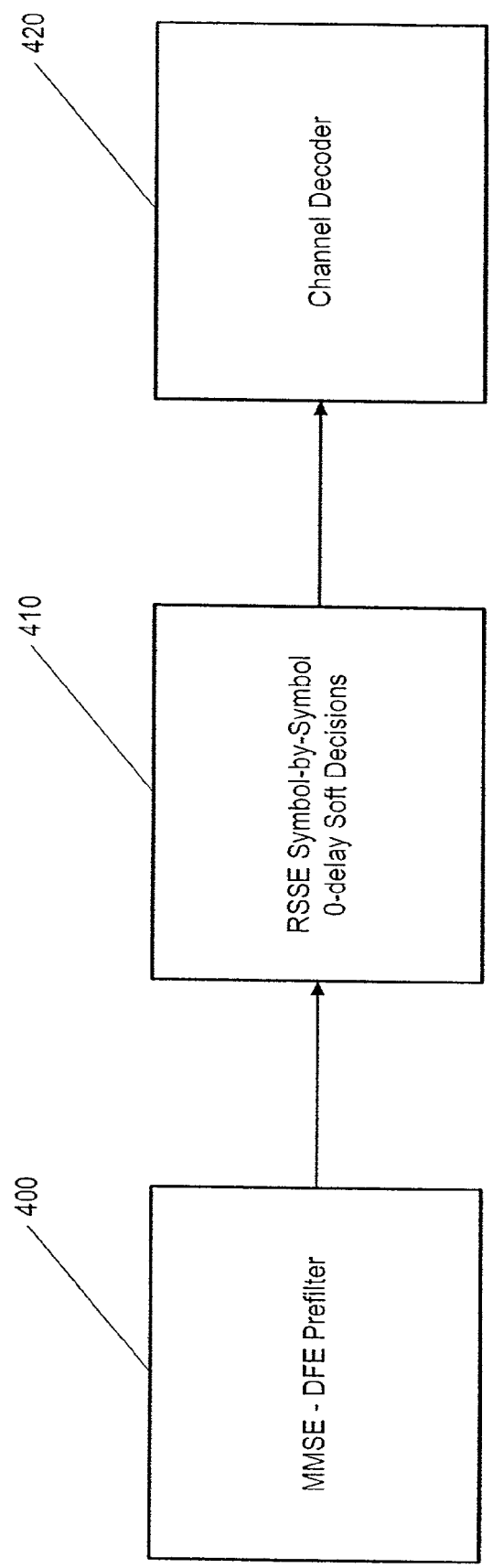
FIG. 4 depicts an aspect of an embodiment in which soft bits are computed symbol-by-symbol using with zero delay.

FIG. 4 depicts an aspect of the invention in which soft bits are computed symbol-by-symbol using zero delay. First a received signal is subjected to an MMSE-DFE prefilter step 400, then is processed in a RSSE symbol-by-symbol zero-delay soft decision step 410, and finally is decoded in a channel decoder step 420.

The RSSE Symbol-by-symbol zero-delay soft decision step 410 advantageously employs a trellis calculation, and implemented with a maximum complexity that is twice as complex as implementation of decision-feedback equalization would be. This RSSE Symbol-by-symbol zero-delay soft decision step 410 will preferably be performed according to a rule described mathematically as follows:

$$\beta_{0delay}(s_{k+1} = a_k) \approx \min_{(s_k)} \{\mu(s_k) + \lambda(s_k, s_{k+1})\} \quad (2)$$

in which beta represents a zero-delay log symbol probability function, $s_k$ denotes a previous symbol decision, $s_{k+1}$ denotes a current symbol decision, $a_k$ represents a symbol of a modulation alphabet, min is a minimizing function, mu (μ) and lambda (λ) represent two paths connecting two states.

Figure 5:
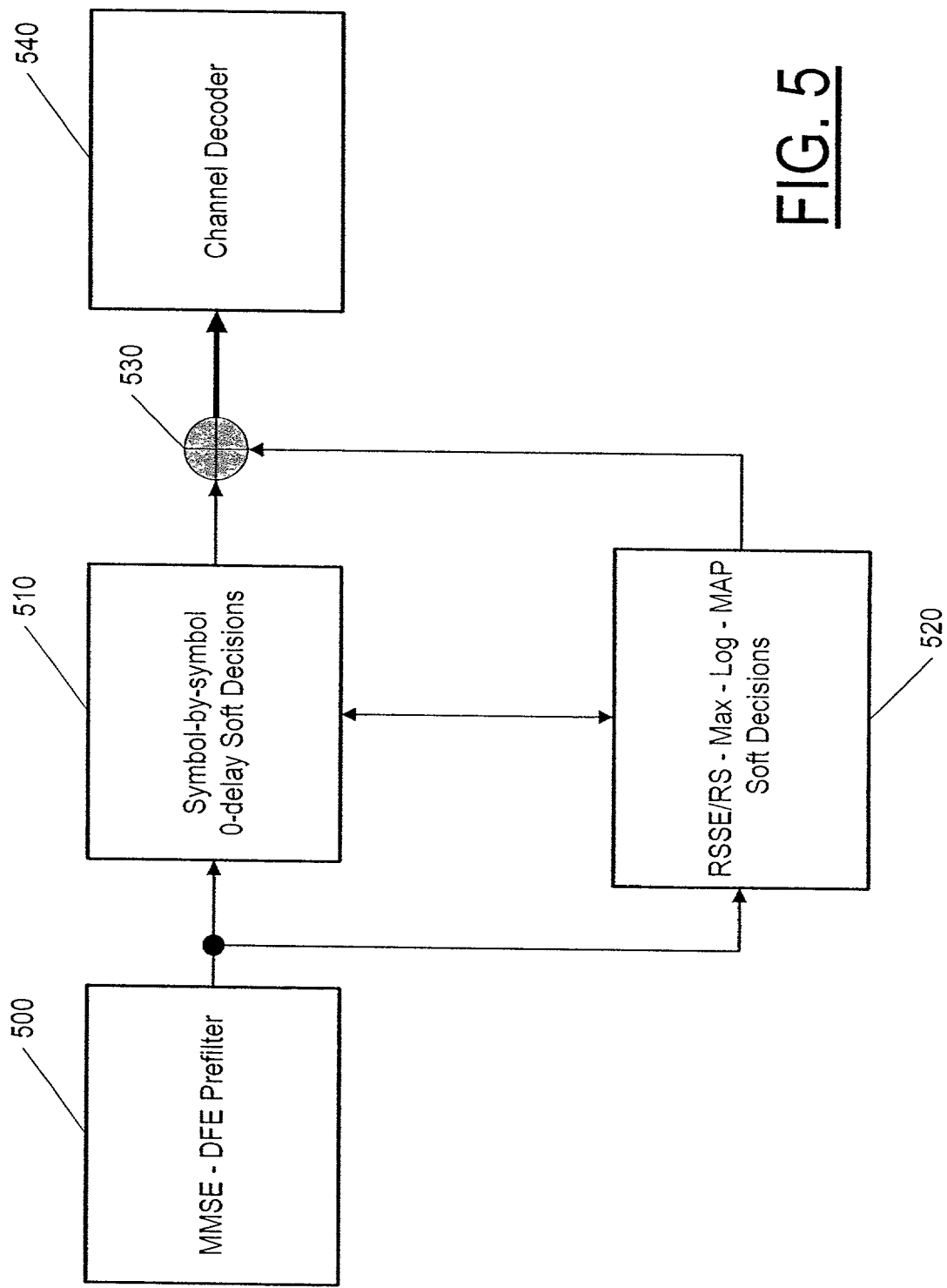
FIG. 5 illustrates an embodiment of the present invention employing zero delay and either RSSE or Max-Log-MAP.

FIG. 5 illustrates an embodiment of the present invention employing zero delay and either RSSE or Max-Log-MAP.

This FIG. 5 is similar to the embodiment shown in FIG. 3, the primary difference being that the DFE step 310 of FIG. 3 is replaced by the symbol-by-symbol zero-delay soft decision step 410 of FIG. 4. The flow chart of FIG. 5 begins with a prefiltering step 500, followed by a symbol-by-symbol zero-delay soft decision step 510 and an RSSE/Max-Log-MAP soft decision step 520 (steps 510 and 520 can occur in either order), and then a soft bit output step 530 followed by a decoding step 540.

When the non-zero delay trellis computation involves max-log-MAP, as may occur in step 320 of FIG. 3 or step 520 of FIG. 5, further efficiency is obtained if first and second subsets of signals are established by Euclidean partitioning so as to reduce trellis size to two states corresponding to the first and second subsets respectively. Then the more likely of the two states is determined, and Euclidean distances are computed for all paths corresponding to the more likely state; only the paths corresponding to the more likely state would then be used to perform trellis computation of soft bits in step 510 of FIG. 5. A decision produced by the symbol-by-symbol zero-delay soft decision step 510 can be used to limit the number of states involved in the RSSE/Max-Log-MAP step 520, and that is necessary in a best mode embodiment of the present invention.

Figure 6:
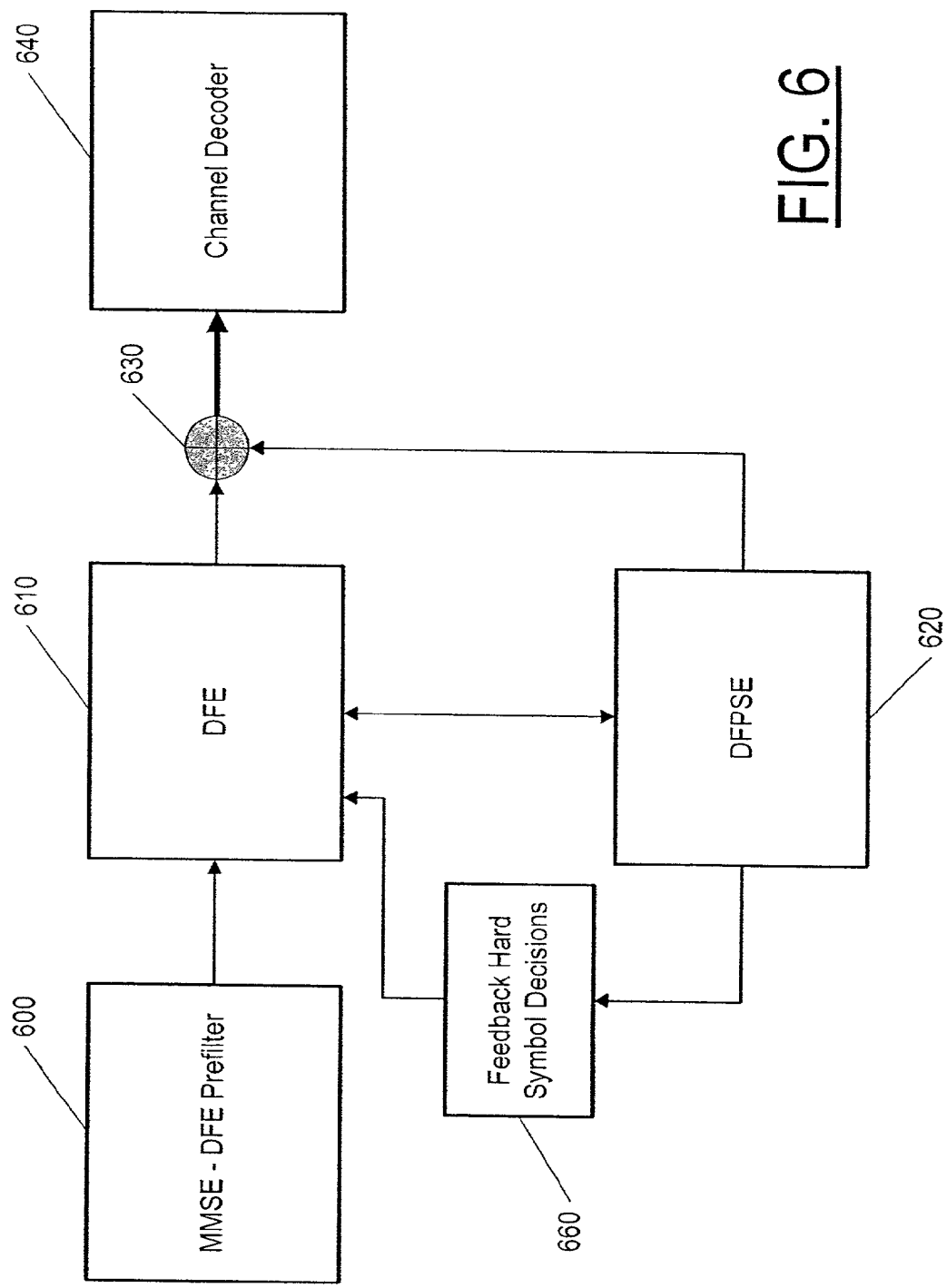
FIG. 6 shows an embodiment of the present invention employing DFE and DFPSE.

FIG. 6 shows another best mode embodiment of the present invention, employing DFE and decision feedback partial sequence equalization (DFPSE). FIG. 6 is, again, similar to the embodiment shown in FIG. 3, the primary difference being that the RSSE/Max-Log-MAP step 320 of FIG. 3 is replaced by a DFPSE step 620 which (again) involves a non-zero delay reduced state trellis calculation. The flow chart of FIG. 6 begins with a prefiltering step 600, followed by a DFE step 610 and a DFPSE step 620. Steps 610 and 620 can occur in either order, and in either case a feedback step 660 feeds hard symbol decisions from DFPSE to DFE. Decisions produced by DFE can be used to reduce the number of states in the DFPSE trellis. The final steps in this embodiment are soft bit output 630 followed by decoding 640.

It should be emphasized that in all of the best mode embodiments shown in the figures, a non-zero delay reduced state trellis step computes soft bits and hard symbol decisions, either before or after a DFE/zero-delay step also computes soft bits. Furthermore, this DFE/zero-delay step always utilizes the hard symbol decisions to compute soft bits. The present invention thus ensures that, in one way or another, soft bits are efficiently calculated for substantially all bits transmitted in a received signal.

Those skilled in the art will understand that each of the best mode embodiments described herein can be implemented in a variety of ways, by a variety of different combinations of hardware and software, and will further understand that the structures, steps, and interactions described herein are conceptual elements that likewise can be implemented by various combinations of hardware and software and integrated with a variety of other structures, steps, and interactions.

Generally speaking, the present invention includes novel methods of soft bit computation for any reduced state equalizer. Although perhaps somewhat repetitive, it may be useful to now discuss further some general characteristics and examples of the invention in the context of EDGE at 8PSK. We shall consider soft bit generation algorithms for a reduced state set partitioning Max-Log-MAP equalizer using 8PSK as an example, although the same ideas are also applicable to RSSE or DFPSE equalization. As an example we will use a 2-state Max-Log-MAP equalizer for EDGE 8-PSK in which J={2,1,1,1,1}.

Figure 7:
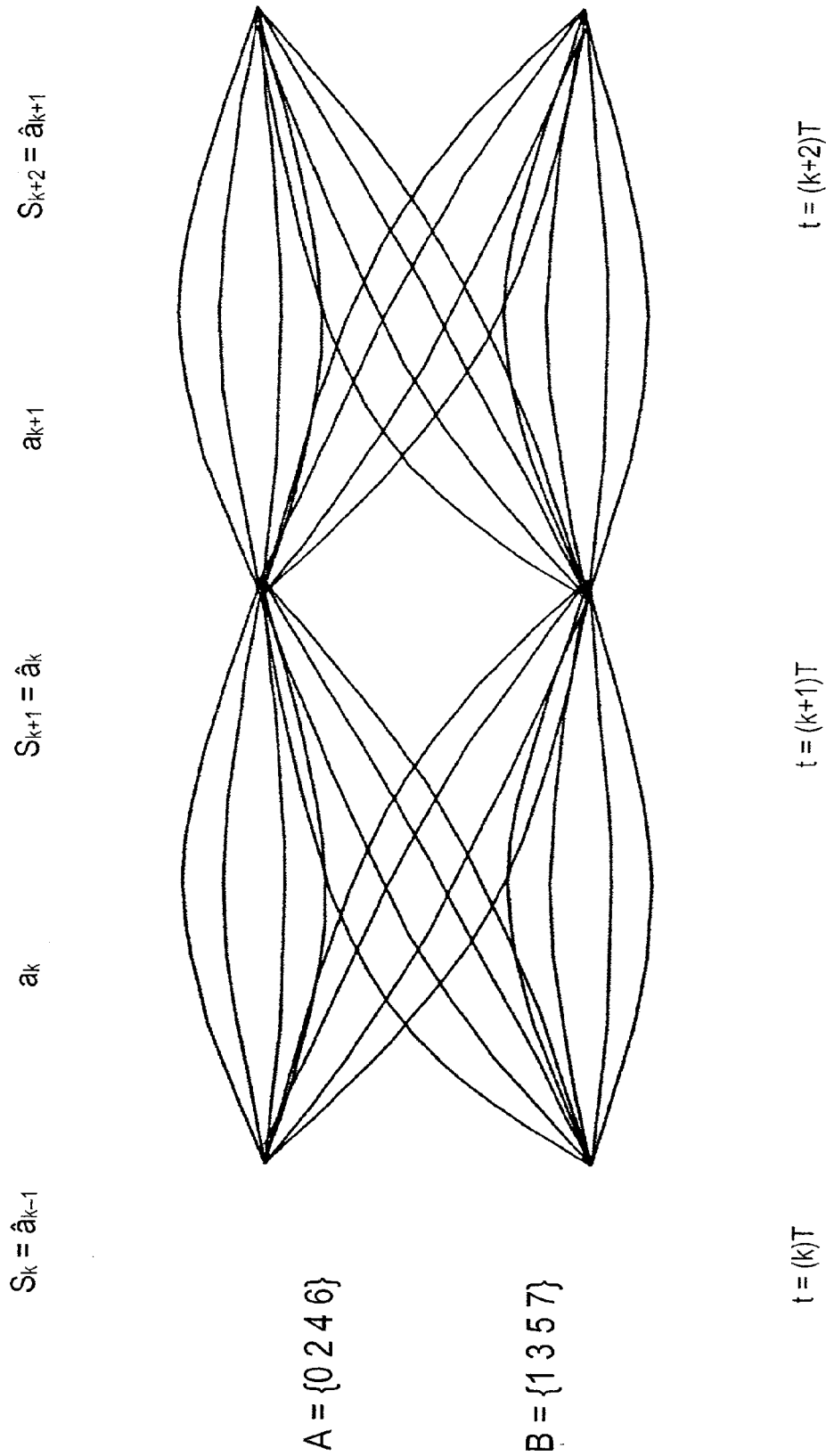
FIG. 7 shows a trellis for a two-state equalizer.

Let us consider 2-state, 2-way set partitioning Max-Log-MAP soft bit detection. This example will have three phases, but first some preliminaries. Divide the 8PSK signal constellation $\{0,1 \ldots 7\}$ into two subsets A and B where A={0,2,4,6}, and B={1,3,5,7}. The subsets are chosen such that the minimum Euclidean distance between any points in the subset is maximized, as discussed in the article by Eyuboglu and Qureshi. This type of partitioning is called Euclidean partitioning. The subset trellis for a 2-tap equalizer (K=2) is shown in FIG. 7. A normal Viterbi trellis contains 8 states corresponding to 8 signal points. In the present case, the trellis size is reduced to two states corresponding to two sub sets A and B. Note from FIG. 7 that there are parallel transitions merging at each node. Since the Euclidean distance between the points in a given subset is maximized, early merging paths can be reliably distinguished. A minimum phase condition is required when making such early decisions. Now we would like to incorporate forward Max-Log-MAP detection through this reduced state trellis. The prefiltered-received signal sampled at symbol rate can be written as:

$$r(k) = a_0 h_0 + \sum_{j=1}^{L-1} a_{k-j} h_j + n(k) \quad (3)$$

Where $a_k$ is the 8PSK modulation alphabet, $h_k$ is the channel impulse response of length L, and n(k) is the thermal noise. To reduce complexity, the first K taps are used in the main part of the trellis, and decision feedback is used for the remaining taps. Then the number of states in the trellis is given by $2^{K-1}$. In FIG. 7, the number of states is restricted to 2. Referring to FIG. 7, a symbol $a_k$ arrives at t=kT, and $s_k$ denotes the state at t=kT. The state labeling is given by $s_k = \hat{a}_{k-1}$ and $s_k$ contains the previous symbol decision. Furthermore, $s_{k+1} = \hat{a}_k$ and $s_{k+1}$ denotes the current symbol decision.

The first phase in this 2-state, 2-way set partitioning Max-Log-MAP soft bit detection example begins by adding the path metric $\lambda(s_k, s_{k+1})$ to the old path metric $\mu(s_k)$ for all the paths merging at a given state $S_{k+1}$, and choosing the minimum distance winner path. Then store $\hat{a}_k$ for this winner path and update the path history. This is denoted by the following equation:

$$\mu(s_{k+1}) \approx \min_{(s_k)}\{\mu(s_k) + \lambda(s_k, s_{k+1})\} \quad (4)$$

where $s_k$ denotes all the states corresponding to previous symbol $\hat{a}_{k-1}$. In FIG. 7, there are 8 branches leaving each node $s_k = \hat{a}_{k-1}$, and 8 branches merging at each node $s_{k+1} = \hat{a}_k$. The state dependent path history contains all previous L–K decisions on $\tilde{a}_k$. The path metric for each branch connecting $(s_k, s_{k+1})$ is defined as $$\lambda(s_k, s_{k+1}) = \frac{\left\| r_k - \left( a_k h_0 + \hat{a}_{k-1} h_1 + \sum_{j=2}^{L} \tilde{a}_{k-j} h_j \right) \right\|^2}{2\sigma^2} \quad (5)$$

In equation (5), $\hat{a}_k$ is obtained from the previous state $s_k$, and $\tilde{a}_k$ is the path history stored in $s_k$.

The second phase in this example is max-log-MAP symbol detection with 1-symbol delay. In FIG. 7, decisions on symbol $a_k$ are made with 1-symbol delay at $t=(k+1)$ T meaning at state $s_{k+1}$. According to forward MAP criterion (forward MAP is used in this example but the invention is also applicable when backward recursion is included), it is known in the art that the state probabilities are given by:

$$P(s_{k+1}) = \sum_{s_{k+2}} \exp[-\{\mu(s_{k+1}) + \lambda(s_{k+1}, s_{k+2})\}] \quad (6)$$

in which $s_{k+2}$ denotes all the paths leaving state $s_{k+1}$. In the example of FIG. 7, there are eight branches leaving each state. The summation in equation (6) is performed for all 8 branches leaving $s_{k+1}$. To make a decision on symbol $\hat{a}_k$ we need to decide whether $\hat{a}_k$ belongs to subset A or subset B. First compute, $$P(s_{k+1} = A) = \sum_{s_{k+2}} \exp[-\{\mu(s_{k+1} = A) + \lambda(s_{k+1} = A, s_{k+2})\}] \quad (7)$$

$$P(s_{k+1} = B) = \sum_{s_{k+2}} \exp[-\{\mu(s_{k+1} = B) + \lambda(s_{k+1} = B, s_{k+2})\}] \quad (8)$$

The summation is performed for $s_{k+2}=A$ and $s_{k+2}=B$. The hard decision rule to detect symbol $\hat{a}_k$ is given by this rule: if $P(s_{k+1}=A) > P(s_{k+1}=B)$, then $\hat{a}_k$ belongs to state A. This means that the current symbol stored in state A will be the detected symbol. In practice it is easier to deal with log symbol probabilities for complexity reduction purposes. Define beta as follows:

$$\beta(s_{k+1}=A) = -\ln oP(s_{k+1}=A)]. \quad (9)$$

The presence of exponentials in equation (6) is computationally expensive, and we resort to the Max-Log approximation for numerical simplification. The negative logarithm of a sum of exponentials can be approximated as:

$$-\ln\left(\sum_j e^{-\delta_j}\right) = \min(\delta_1, \delta_2 \dots \delta_j) \quad (10)$$

Then equation (9) can be simplified as:

$$\beta(s_{k+1}=A) \approx \min_{(s_{k+2})} \{\mu(s_{k+1}=A) + \lambda(s_{k+1}=A, s_{k+2})\} \quad (11)$$

The third phase in this example is soft bit generation. In order to take full advantage of soft bit decoding gain, we need to convert the detected symbol bit probabilities to bit probabilities. Let us assume that state $s_{k+1}$ takes two possibilities A=0 and B=1. Symbols 0 and 1 are mapped to the bits (111) and (011) respectively. Then the bit probabilities can be written as:

$$Pb_0(0) \approx 0 \text{ and } Pb_0(1) = P(0) + P(1) \approx 1.0 \text{ and } Pb_1(0) \approx 0 \quad (12)$$

and $$Pb_1(1) = P(0) + P(1) \approx 1.0 \text{ and } Pb_2(0) = P(1) \text{ and } Pb_2(1) = P(0) \quad (13)$$

where $Pb_i(0)$ denotes the probability of the i'th bit position being zero. It is clear that we can generate appropriate bit probabilities for the most significant bit (MSB), and the remaining two bit positions can have hard decisions only. Since it is computationally efficient to deal with log bit probabilities, we use the following definition for bit log-likelihood-ratios (LLR):

$$q_i = -\ln(Pb_i(1)/Pb_i(0)) \quad (14)$$

Then the LLR for each bit position can be written as:

$$q_0 \approx \pm\infty \text{ and } q_1 \approx \pm\infty \text{ and } q_2 \approx \beta(1) - \beta(0) \quad (15)$$

In short, 2-state, 2-way set partitioning Max-Log-MAP soft bit detection can be described in the following phases. First, compute Euclidean distances for all the 16-paths originating from nodes A and B. Second, for the MSB, search for a minimum distance among all 16 paths that have a zero in the MSB position, and repeat this process for bit 1 in the MSB position (soft information for the MSB is defined as the difference between these two minimum distances). Third, repeat the second phase for all other bit positions.

For computational efficiency, we generate soft bit information directly from the Euclidean distances. We avoid the intermediate step of symbol probability generation. In this particular example, we can generate soft bit information for the MSB only; the other two bits remain in an initialization state causing soft decision failure. The present invention conveniently includes several solutions solutions that will remedy this 2-way set partitioning Max-Log-MAP soft bit detection failure problem. Further simplification can be obtained by calculating one Euclidean distance for all the parallel transitions between two nodes: first make a hard decision using a slicing operation, and then compute one Euclidean distance for the part corresponding to the hard decision. This reduces implementation complexity in both the Max-Log-MAP and the Viterbi part of the algorithm.

A first "soft decision feedback" solution to this 2-way set partitioning max-log-MAP soft bit detection failure problem can be described as follows. Generate hard decisions $b_k$ from RSSE/RS-Max-Log-MAP. Then run DFE with RSSE/RS-Max-Log-MAP hard decisions in the feedback part. For bits that remain in an initialization state, generate soft bit information for those remaining bits. For the MSB in the given example, use Max-Log-MAP. This first solution can best be understood by again referring to FIG. 7. At state $s_{k+1}$ use RSSE/Max-Log-MAP to create soft bit information on symbol $a_k$ for possible bits, and to create soft information for the remaining bits run DFE on the received signal $r_k$ with Max-log-MAP hard decisions $b_k$ as feedback. This leads us back to equation (1) above, and this "soft decision feedback solution" generally corresponds to the flow chart in FIG. 3.

A second solution to this 2-way set partitioning max-log-MAP soft bit detection failure problem may be called the "symbol-by-symbol soft bit" solution, and it generally corresponds to the flow chart in FIG. 4. In this solution, symbol-by-symbol soft bit information is generated in the trellis without any delay. Referring again to FIG. 7, search for soft bit information for all the 16 paths arriving at $s_{k+1}$. Use the rule given by equation (2) above. In equation (2), to detect symbol $a_k=0$, minimization is performed for the sixteen paths originating from $s_k$. The complexity of this method is exactly twice that of DFE.

A third solution to this 2-way set partitioning max-log-MAP soft bit detection failure problem may be called the "improved soft bit" solution, and it generally corresponds to the flow chart in FIG. 5. In this solution, we utilize the improvements from both the first "soft decision feedback" solution, and from the second "symbol-by-symbol soft bit" solution. Begin by generating possible soft bit information using Max-Log-MAP. Then use the second "symbol-bysymbol soft bit" solution to generate soft information for the remaining bits. Referring again to FIG. 7, at state $s_k$ store the Euclidean distance for all the 16 paths. During the next symbol interval (i.e. at state $s_{k+1}$), generate soft bit information for the MSB. Then generate soft information for the remaining bits by searching through the 16 paths stored in the previous symbol interval. To further reduce the complexity of this "improved soft bit" solution, Max-Log-MAP detects the symbol $a_{k-1}$ at state $s_k$. Then, store the 8-paths originating from $s_k = a_{k-1}$ only, instead of all 16-paths. We only need to search through these 8-paths for computing the soft bit information. Instead of using max-log-MAP, one can use an RSSE/MLSE soft output Viterbi algorithm (SOVA) to compute soft bit information. However, if soft bit computation is not possible for a particular bit, then we can replace it using the "soft decision feedback solution" or using zero-delay.

A fourth solution to this 2-way set partitioning max-log-MAP soft bit detection failure problem may be called the "max-log-MAP with L symbol delay" solution. So far, we have implemented max-log-MAP with K symbol delay (i.e. one symbol delay for the 2-state case shown in FIG. 7). We can get some extra gain by delaying max-log-MAP decisions by an amount greater than the K symbol delay.

A fifth solution to this 2-way set partitioning max-log-MAP soft bit detection failure problem may be called the "solutions one to four plus traceback" solution. It is generally believed that the hard decisions given by the traceback operation contain fewer errors than solutions 1–4. Hence, we have proposed, in the present invention, to generate hard decisions from traceback, and check if these decisions match the hard decisions from solutions 1–4. If not, replace the soft bit information from solutions 1–4 with the traceback hard decisions.

Figure 8:
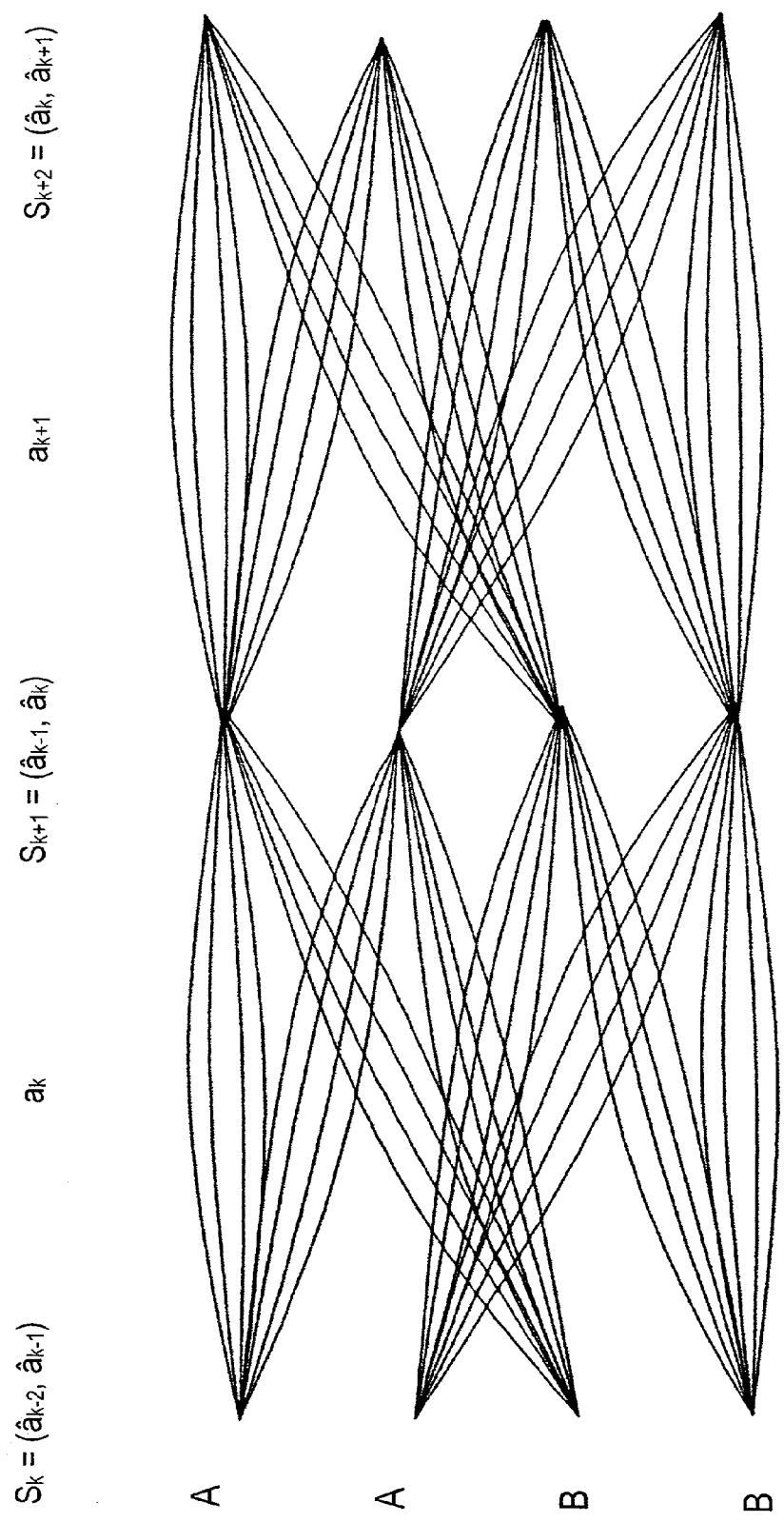
FIG. 8 shows a trellis for a four-state equalizer.

Up until now, the example we have been considering has involved a 2-state Max-Log-MAP equalizer for EDGE 8-PSK in which J={2,1,1,1,1}, and we have been considering 2-way set partitioning Max-Log-MAP soft bit detection. But suppose we have a 4-state Max-Log-MAP equalizer, and let us consider 2-way set partitioning and soft bit detection by analogy with the two-state example. Instead of FIG. 7, we must now refer to the 3-tap, 4-state trellis diagram of FIG. 8. In FIG. 8, each state $s_k$ can have four possibilities AA, AB, BA, BB where A takes one of the four symbols from the subset {0,2,4,6}, and B takes values from the subset {1,3,5,7}. The state labeling is given by:

$$s_k = (\hat{a}_{k-2}, \hat{a}_{k-1}) \text{ and } s_{k+1} = (\hat{a}_{k-1}, \hat{a}_k) \quad (16)$$

There are two phases in this 4-state, 2-way set partitioning Max-Log-MAP soft bit detection example. The first step utilizes an equation which is a slight revision of equation (4):

$$\mu(s_{k+1}) \approx \min_{(s'_k)} \{\mu(s'_k) + \lambda(s'_k, s_{k+1})\} \quad (17)$$

Equation (17) denotes that for all the paths merging at a given state $s_{k+1}$, add the path metric $\lambda(s'_k, s_{k+1})$ to the old path metric $\mu(s'_k)$, and choose the minimum distance winner path. We introduce the notation $s'_k$ to denote all the paths originating from nodes $s'_k$ and merging at node $s_{k+1}$. The path metric is defined by an equation which is a slight revision of equation (5):

$$\lambda(s'_k, s_{k+1}) = \frac{\left\| r_k - \left( a_k h_0 + \sum_{j=1}^{K-1} \hat{a}_{k-j} h_j + \sum_{j=K}^{L-1} \tilde{a}_{k-j} h_j \right) \right\|^2}{2\sigma^2} \quad (18)$$

where $\hat{a}_k$ is obtained from the previous state $s'_k$, and $\tilde{a}_k$ is the path history stored in $s'_k$. From FIG. 8, all the paths merging at $s_{k+1}$=AA can have transitions originating from $s'_k$=AA and $s'_k$=BA only. In this case equation (17) can be written as:

$$\mu(s_{k+1}=AA) \approx \min_{(s'_k)} \{\mu(s'_k) + \lambda(s'_k, AA)\} \quad (19)$$

where $s'_k$ takes two possibilities (AA and BA). After determining the winner path, update the state-dependent path history vector $\tilde{a}_k$.

The second phase of this 4-state, 2-way set partitioning Max-Log-MAP soft bit detection example requires that the state probabilities are given by:

$$P(s_{k+K-1}) = \sum_{s'_{k+K}} \exp[-\{\mu(s_{k+K-1}) + \lambda(s_{k+K-1}, s'_{k+K})\}] \quad (20)$$

according to forward MAP criteria. For K=3, as is evident from FIG. 8, equation (20) can be written as:

$$P(s_{k+2}) = \sum_{s'_{k+3}} \exp[-\{\mu(s_{k+2}) + \lambda(s_{k+2}, s'_{k+3})\}] \quad (21)$$

In equation (21), $s'_{k+3}$ denotes all the paths leaving nodes $s_{k+2}$ and terminating at $s'_{k+3}$. For example, if $s_{k+2}$=AA, then $s'_{k+3}$ takes two possibilities: AA and BA. There are a total of eight branches leaving $s_{k+2}$=AA and terminating at $s'_{k+3}$=AA or $s'_{k+3}$=BA. Accordingly:

$$P(s_{k+2}=AA) = \sum_{s'_{k+3}} \exp[-\{\mu(s_{k+2}=AA) + \lambda(s_{k+2}=AA, s'_{k+3})\}] \quad (22)$$

$$P(s_{k+2}=BA) = \sum_{s'_{k+3}} \exp[-\{\mu(s_{k+2}=BA) + \lambda(s_{k+2}=BA, s'_{k+3})\}] \quad (23)$$

Then we find that:

$$P(s_{k+2}=A) = P(s_{k+2}=AA) + P(s_{k+2}=BA) \quad (24)$$

Similarly:

$$P(s_{k+2}=B) = P(s_{k+2}=AB) + P(s_{k+2}=BB) \quad (25)$$

The final decision on symbol $\hat{a}_k$ would be one of the two states A or B, whichever is more probable. Since we are interested in the soft bit information, we need to compute bit level soft information. This is done exactly same way as described above in the two-state example. Moreover, equations (21)–(24) can be generalized to any set partitioning type, and to an arbitrary number of taps, in a straightforward way.

Although this invention has been shown and described with respect to best mode embodiments and specific examples thereof, it should be understood by those skilled in the art that the foregoing and numerous other changes, omissions and additions in form and detail may be made therein without departing from the spirit and scope of the present invention.

What is claimed is:

1. A method of soft bit computation for a reduced-state equalizer, comprising the steps of:
   (a) computing a first set of soft bits for bits transmitted in a received signal, wherein the first set is computed using a reduced-state trellis with finite non-zero delay
   (b) calculating hard decisions in response to the received signal, and
   (c) ensuring that substantially all soft bits are computed, by employing zero-delay soft decision-making or decision-feedback equalization to compute a second set of soft bits, while also using the hard decisions to compute the second set.

2. The method of claim 1, wherein the computing of soft bits produces log-likelihood ratios.

3. The method of claim 1, wherein the finite non-zero delay is K−1, wherein K represents a truncated impulse response length, wherein K=0 for the zero-delay soft decision-making, and wherein K is less than a non-truncated impulse response length L unless K is equal to L.

4. The method of claim 1, wherein the method includes recursion to compute the first set, and the recursion includes only forward recursion which is sufficient recursion.

5. The method of claim 1,
   wherein the steps are performed in a sequence (a), (b), and (c) one after another,
   wherein step (c) is performed so that the first set of soft bits and the second set of soft bits are soft bits for two different sets of bits, and
   wherein the hard decisions are calculated using the first set of soft bits.

6. The method of claim 1, wherein step (c) is performed before step (a), and wherein a soft bit computed in step (c) for a certain bit is replaced with a soft bit computed in step (a) if a soft bit for the certain bit is computed in step (a).

7. The method of claim 1, wherein step (a) is performed for as many bits as possible while maintaining acceptable implementation complexity.

8. The method of claim 1, wherein the trellis has a number of states S and a number of taps K, and wherein 2S equals 2 to the K power, i.e. $2S=2^K$.

9. The method of claim 1, wherein the computation of step (a) produces soft bits using a maximum a posteriori technique.

10. The method of claim 9, wherein the maximum a posteriori technique is a max-log maximum a posteriori technique.

11. The method of claim 1, wherein the computation of step (a) produces soft bits with reduced state sequence estimation.

12. The method of claim 1, wherein the computation of step (a) utilizes a maximum likelihood technique.

13. The method of claim 1, wherein the computation of step (a) produces soft bits with decision feedback partial sequence equalization.

14. The method of claim 6, wherein the second set of soft bits are computed in step (c) using the decision-feedback equalization which provides information as to a reduced number of states that will be needed for the computation in step (a).

15. The method of claim 14, wherein the computation in step (a) employs decision feedback partial sequence equalization.

16. The method of claim 1, wherein the hard decisions are used to compute soft bits so as to reduce error propagation.

17. The method of claim 1, wherein the zero-delay soft decision-making is performed using a trellis.

18. The method of claim 1, wherein the decision-making of step (c) is implemented with a maximum complexity that is twice as complex as implementation of decision-feedback equalization would be.

19. The method of claim 18, wherein the zero-delay soft decision-making of step (c) is performed according to a rule described mathematically as follows:

$$\beta_{0delay}(s_{k+1}=a_k) \approx \min_{(s_k)}\{\mu(s_k)+\lambda(s_k, s_{k+1})\}$$

in which beta represents a zero-delay log symbol probability function, $s_k$ denotes a previous symbol decision, $s_{k+1}$ denotes a current symbol decision, $a_k$ represents a symbol of a modulation alphabet, min is a minimizing function, and mu ($\mu$) and lambda ($\lambda$) represent two paths connecting two states.

20. The method of claim 1, also comprising the steps of:
   (d) generating further hard decisions using a traceback operation,
   (e) checking if the further hard decisions generated using the traceback operation match the hard decisions already generated using the trellis,
   (f) replacing soft bits generated using the trellis with the further hard decisions generated using the traceback operation, if the further hard decisions generated from the traceback operation fail to match respective hard decisions already generated using the trellis.

21. The method of claim 1, wherein the computation of step (a) employs a Viterbi algorithm.

22. The method of claim 21, wherein the computation of step (a) employs a soft output Viterbi algorithm.

23. The method of claim 1, wherein the zero-delay computation of step (c) includes the steps of:
   establishing a first subset of signals and a second subset of signals by Euclidean partitioning which reduces trellis size to two states corresponding to the first subset and the second subset respectively,
   determining which of the two states is a more likely state,
   computing Euclidean distances for at least all paths corresponding to the more likely state, and
   using only the paths corresponding to the more likely state to perform the computation of step (c).

24. The method of claim 10, wherein the hard decisions are computed using the max-log maximum a posteriori technique.

25. The method of claim 11, wherein the hard decisions are computed in step (b) using the reduced state sequence estimation or decision feedback partial sequence estimation.

26. The method of claim 24, wherein the decision feedback equalization is employed in step (c) according to a rule described mathematically as follows:

$$\beta_{DFE}(a_k) \approx \left\| r_k - \left( a_k h_o + \sum_{j=1}^{L-1} b_{k-j} h_j \right) \right\|^2$$

in which beta represents a log symbol probability function, $a_k$ represents a symbol of a modulation alphabet, $r_k$ is a received signal, $b_k$ are the hard decisions, and $h_k$ is channel impulse response length.

27. The method of claim 25, wherein the decision feedback equalization is employed in step (c) according to a rule described mathematically as follows:

$$\beta_{DFE}(a_k) \approx \left\| r_k - \left( a_k h_o + \sum_{j=1}^{L-1} b_{k-j} h_j \right) \right\|^2$$

in which beta represents a log symbol probability function, $a_k$ represents a symbol of a modulation alphabet, $r_k$ is a received signal, $b_k$ are the hard decisions, and $h_k$ is channel impulse response length.

28. A reduced-state equalizer (200) capable of providing soft bits to a decoder (290) in order to enhance reliability of channel decoding subsequent to equalization, the reduced-state equalizer comprising:
  a reduced-state trellis module (220), responsive to a received bit signal (260), for providing a first soft bit signal (280) and a hard decision signal (270); and
  a gap-filler module (210), responsive to the received bit signal and also responsive to the hard decision signal (270), for providing a second soft bit signal (292),
  wherein the second soft bit signal (292) includes soft bits that are absent from the first soft bit signal, so that the first and the second soft bit signals include soft bits for substantially all bits in the received bit signal (260),
  wherein the reduced-state trellis module (220) is configured to operate with finite non-zero delay, and
  wherein the gap-filler module (210) is configured as a decision feedback equalizer or as a zero-delay soft decision-maker.

29. A receiver for a wireless communication device, configured to mitigate intersymbol interference contained in a received signal (260), comprising:
  a decoder (290), responsive to a first soft bit signal (280) and a second soft bit signal (292), for providing a reliably decoded signal (297),
  a reduced-state equalizer (200) capable of providing soft bits to the decoder (290) in order to enhance reliability of channel decoding subsequent to equalization, the reduced-state equalizer including
    a reduced-state trellis module (220), responsive to a received bit signal (260), for providing the first soft bit signal (280) and a hard decision signal (270); and
    a gap-filler module (210), responsive to the received bit signal and also responsive to the hard decision signal (270), for providing the second soft bit signal (292),
  wherein the second soft bit signal (292) includes soft bits that are absent from the first soft bit signal, so that the first and the second soft bit signals include soft bits for substantially all bits in the received bit signal (260),
  wherein the reduced-state trellis module (220) is configured to operate with finite non-zero delay, and
  wherein the gap-filler module (210) is configured as a decision feedback equalizer or as a zero-delay soft decision-maker.

* * * * *